US012619014B2

(12) United States Patent
Tsukao

(10) Patent No.: US 12,619,014 B2
(45) Date of Patent: May 5, 2026

(54) PSEUDO RANDOM DOT PATTERN AND CREATION METHOD OF SAME

(71) Applicant: DEXERIALS CORPORATION, Shimotsuke (JP)

(72) Inventor: Reiji Tsukao, Utsunomiya (JP)

(73) Assignee: DEXERIALS CORPORATION, Shimotsuke (JP)

( * ) Notice: Subject to any disclaimer, the term of this patent is extended or adjusted under 35 U.S.C. 154(b) by 937 days.

(21) Appl. No.: 17/797,905

(22) PCT Filed: Feb. 6, 2021

(86) PCT No.: PCT/JP2021/004471
§ 371 (c)(1),
(2) Date: Aug. 5, 2022

(87) PCT Pub. No.: WO2021/161934
PCT Pub. Date: Aug. 19, 2021

(65) Prior Publication Data
US 2023/0176263 A1    Jun. 8, 2023

(30) Foreign Application Priority Data

Feb. 12, 2020    (JP) ................................. 2020-021963
Feb. 5, 2021    (JP) ................................. 2021-017864

(51) Int. Cl.
*G02B 5/02*    (2006.01)
(52) U.S. Cl.
CPC ................................. *G02B 5/0221* (2013.01)

(58) Field of Classification Search
CPC .. G02B 5/0221; G02B 5/0226; G02B 5/0215; G02B 5/021
See application file for complete search history.

(56) References Cited

U.S. PATENT DOCUMENTS

2021/0305195 A1*  9/2021  Tsukao .................... H01L 24/73
2023/0118485 A1*  4/2023  Tsukao ................... C08K 11/00
257/741

FOREIGN PATENT DOCUMENTS

| CN | 101473248 A | 7/2009 |
|---|---|---|
| CN | 109417233 A | 3/2019 |
| JP | 2003-084302 A | 3/2003 |
| JP | 2004-272195 A | 9/2004 |
| JP | 2005-135899 A | 5/2005 |

(Continued)

OTHER PUBLICATIONS

Apr. 22, 2025 Office Action issued in Japanese Patent Application No. 2021-017864.

(Continued)

*Primary Examiner* — Ryan D Howard
(74) *Attorney, Agent, or Firm* — OLIFF PLC.

(57)    ABSTRACT

A pseudo random dot pattern is easily created by a geometric approach. A pseudo random dot pattern 1A is created by arranging zigzag arrangements R at a predetermined pitch in an x direction on an xy plane while periodically altering positions thereof in a y direction, the zigzag arrangements R each including an arrangement Rb and an arrangement Rc repeatedly provided at predetermined intervals in the y direction, the arrangement Rb including dots arranged at a positive inclination, the arrangement Rc including dots arranged at a negative inclination.

20 Claims, 14 Drawing Sheets y DIRECTION x DIRECTION

(56)     References Cited

FOREIGN PATENT DOCUMENTS

| JP | 2006-502442 A | 1/2006 |
| JP | 2008-003234 A | 1/2008 |
| JP | 2010-049267 A | 3/2010 |
| JP | 2015-132689 A | 7/2015 |
| JP | 2016-029446 A | 3/2016 |
| JP | 2018-124595 A | 8/2018 |
| JP | 2019-510996 A | 4/2019 |
| WO | 2012/133943 A1 | 10/2012 |
| WO | 2016/068166 A1 | 5/2016 |
| WO | 2016/068171 A1 | 5/2016 |
| WO | 2017/191779 A1 | 11/2017 |
| WO | 2018/051799 A1 | 3/2018 |
| WO | 2018/074318 A1 | 4/2018 |
| WO | 2018/101105 A1 | 6/2018 |

OTHER PUBLICATIONS

Oct. 25, 2023 Office Action issued in Chinese Patent Application No. 202180012584.2.

Apr. 6, 2021 International Search Report issued in International Patent Application No. PCT/JP2021/004471.

Apr. 6, 2021 Written Opinion issued in International Patent Application No. PCT/JP2021/004471.

May 10, 2022 International Preliminary Report on Patentability issued in International Patent Application No. PCT/JP2021/004471.

Takashi Imamichi et al.; "Non-overlapping Random Dot Pattern Generation Using Nonlinear Optimization"; IPSJ SIG Technical Report; 2012; vol. 2012-AL-140; No. 8; pp. 1-8.

Jun. 25, 2024 Office Action issued in Korean Patent Application No. 10-2022-7026299.

Oct. 17, 2024 Office Action issued in Taiwanese Patent Application No. 110105030.

* cited by examiner y DIRECTION x DIRECTION y DIRECTION x DIRECTION

1A y DIRECTION x DIRECTION y DIRECTION x DIRECTION y DIRECTION x DIRECTION y DIRECTION x DIRECTION y DIRECTION x DIRECTION

R
2
L3
Lα
L2
Rc
Ld
L3
Ru
Rb
L1
Ly
α
Fu
U
pa
1D y DIRECTION x DIRECTION y DIRECTION x DIRECTION

1E y DIRECTION x DIRECTION

1X

10A

10B

10C

PSEUDO RANDOM DOT PATTERN AND CREATION METHOD OF SAME

TECHNICAL FIELD

The present invention relates to a pseudo random dot pattern and a creation method of the same.

BACKGROUND ART

A random dot pattern refers to a condition where dots are disposed in an unpredictable manner without regularity or reproducibility. In contrast, a pseudo random dot pattern looks like a random dot pattern but refers to a condition where dots are disposed in a predictable manner with regularity and reproducibility. Here, dots refer to small spots or structures.

A pseudo random dot pattern can be applied to a light diffusion sheet to prevent the occurrence of a diffraction pattern (Patent Literature 1, Patent Literature 2, and Patent Literature 3). In such a case, the dots must be free of overlap, the dot pattern must be irregular so that no moire fringes occur, and the dot distribution must be uniform so that no unevenness is visually observable and must possess a predetermined number density.

Pseudo random dot patterns are also used for distance measurement etc. For example, a depth camera (Kinect (registered trademark) from Microsoft Corporation) using a projector in which microlenses are disposed in a pseudo random dot pattern has been known.

Among creation methods of a pseudo random dot pattern is a method described in Patent Literature 1, where the positions of respective dots are created using a linear feedback shift register. A molecular dynamics approach and. the like have also been proposed (Non-Patent Literature 1)

CITATION LIST

Patent Literature

Patent Literature 1: Japanese Patent Application Laid-Open No. 2010-49267
Patent Literature 2: Japanese Translation of PCT Patent Application Publication No. 2006-502442
Patent Literature 3: Japanese Translation of PCT Patent Application Publication No. 2019-510996

Non-Patent Literature

Non-Patent Literature 1: The Special Interest Group Technical Reports of IPSJ, Vol. 2012-AL, No. 8, 2012 May 14

SUMMARY OF INVENTION

Technical Problem

There has been a demand for easy creation of a pseudo random dot pattern having a desired number density and periodicity in a short time in comparison to the conventional creation methods of a pseudo random dot pattern.

In view of the foregoing, an object of the present invention is to enable easier creation of a pseudo random dot pattern by a geometric approach.

Solution to Problem

The present inventor has conceived that a pseudo random dot pattern. can. be created by arranging zigzag arrangements R of dots extending in a y direction on an xy plane at a predetermined pitch in the x direction while periodically altering the positions thereof in the y direction, and completed the present invention.

More specifically, the present invention provides a pseudo random dot pattern including zigzag arrangements R arranged at a predetermined pitch in an x direction on an xy plane while periodically altering positions thereof in a y direction, the zigzag arrangements R each including an arrangement Rb and an arrangement Rc repeatedly provided at predetermined intervals in the y direction, the arrangement Rb including dots arranged at a positive inclination, the arrangement Rc including dots arranged at a negative inclination.

In addition, as a creation method of the foregoing pseudo random dot pattern, the present invention provides a creation method of a pseudo random dot pattern, the creation method including arranging zigzag arrangements R at a predetermined. pitch in an x direction on an xv plane while periodically altering positions thereof in a y direction, the zigzag arrangements R each including an arrangement Rb and an arrangement Rc repeatedly provided at predetermined intervals in the y direction, the arrangement Rb including dots arranged at a positive inclination, the arrangement Rc including dots arranged at a negative inclination. The creation method of a pseudo random dot pattern can also be stated as a design method of a pseudo random dot pattern.

The present invention also provides a filler-containing film including a resin layer and a filler, the filler being disposed. in a pseudo random dot pattern in a plan view, the pseudo random dot pattern including zigzag arrangements R arranged at a predetermined pitch in an x direction on an xy plane while periodically altering positions thereof in a y direction, the zigzag arrangements R each including an arrangement Rb and an arrangement Rc repeatedly provided at predetermined intervals in the y direction, the arrangement Rb including fille Particles arranged at a positive inclination, the arrangement Rc including filler particles arranged at a negative inclination.

Advantageous Effects of Invention

The pseudo random dot pattern according to the present invention can be easily created by a geometric approach. The pseudo random dot pattern according to the present invention can thus be used in various products utilizing pseudo random dot patterns by setting the size and number density of the dots, etc., as appropriate based on the purpose of use of the pseudo random dot pattern. For example, if the pseudo random dot pattern according to the present invention is used for a light diffusion sheet, a light diffusion sheet that produces no moire fringes and has no dot unevenness observable even under microscopic observation can be obtained. if the pseudo random dot pattern according to the present invention is used for a dot projector, a pseudo random dot pattern for use in distance measurement and the like can be projected upon an object.

Since the pseudo random dot pattern according to the present invention has predetermined perioddcity, products on which the pseudo random dot pattern is formed can be easily inspected to confirm actual formation of the pseudo random dot pattern.

BRIEF DESCRIPTION OF DRAWINGS

FIG. 1A-2 is an enlarged view of the pseudo random dot pattern 1A according to the embodiment.

DESCRIPTION OF EMBODIMENTS

Figures 1, 1A:
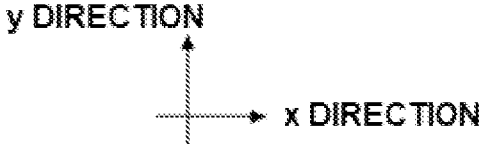
FIG. 1A-1 shows a pseudo random dot pattern 1A according to an embodiment.

A pseudo random dot pattern and a creation method of the same according to an embodiment of the present invention will be described in detail below with reference to the drawings. In the drawings, the same reference numerals represent the same or similar components.
(Dot Pattern)

Figures 1, 1A, 2:
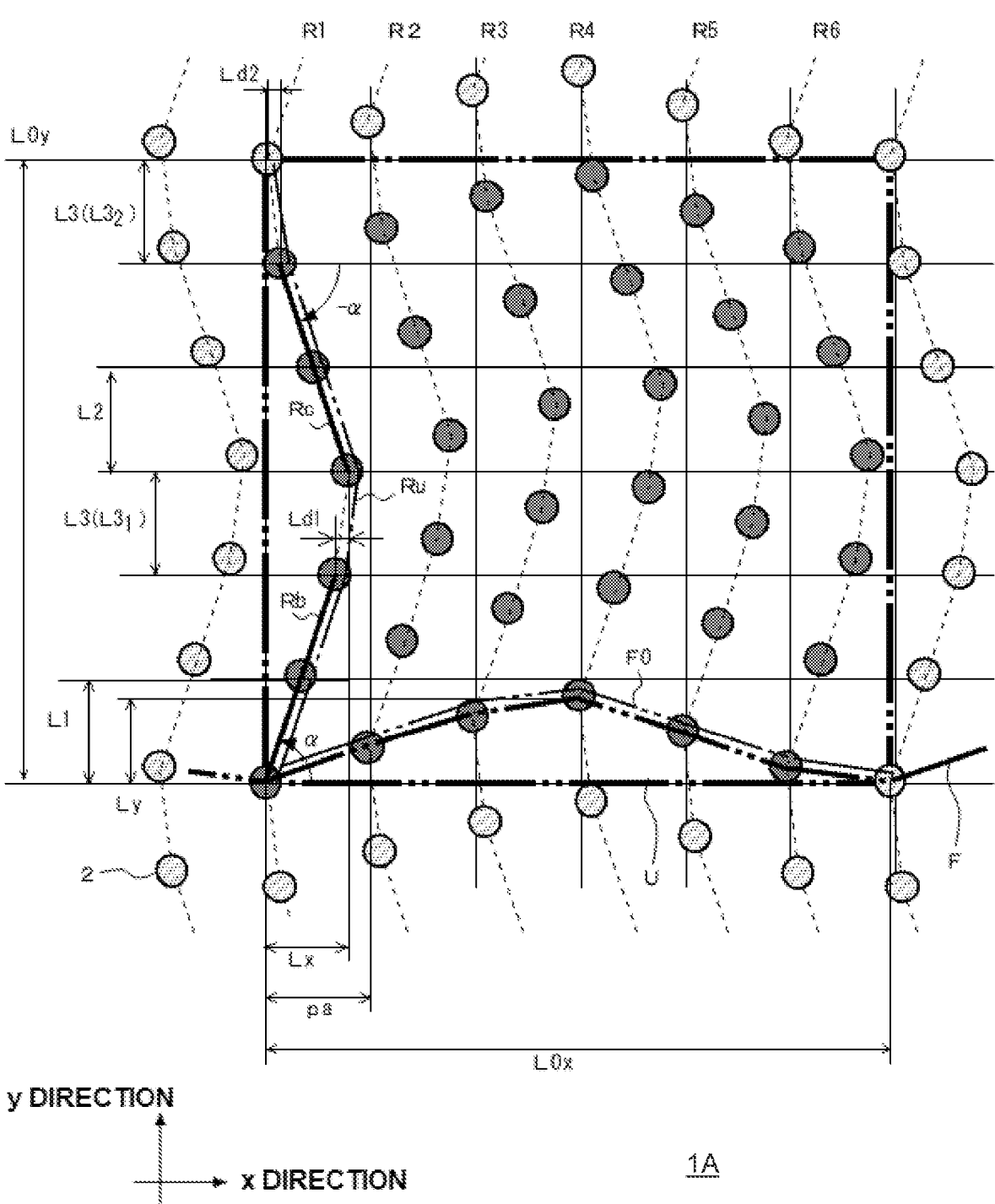
Figure 1B:
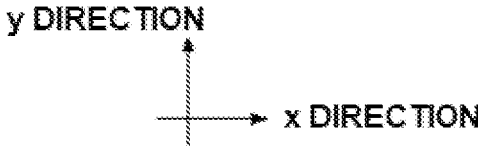
FIG. 1B is an explanatory diagram showing a creation process of the pseudo random dot pattern 1A according to the embodiment.

FIG. 1A-1 shows a pseudo random dot pattern 1A according to the embodiment of the present invention. FIG. 1A-2 is an enlarged view thereof. FIG. 1B an explanatory diagram showing a creation process of FIG. 1A-1.

According to the creation method of the pseudo random dot pattern according to the present invention, a zigzag arrangement R is initially assumed (FIG. 1B) in which an arrangement Rb including dots arranged at a positive inclination and an arrangement Rc including dots arranged at a negative inclination are repeatedly provided at predetermined intervals in a y direction on an xy plane. Next, such zigzag arrangements R are arranged at a predetermined pitch in an x direction while the positions thereof in the y direction are periodically altered (FIG. 1A-1). Here, a dot pattern where zigzag arrangements R are arranged in advance at a predetermined pitch in the x direction may be assumed, and the positions of the zigzag arrangements R constituting the dot pattern in the y direction may be periodically altered.

More specifically, for example, to create the pseudo random dot pattern 1A shown in FIG. 1A-1, an arrangement Rb including three dots 2 arranged at an angle α with respect to the x direction and an arrangement Rc including three dots 2 arranged in a direction reverse to a direction of the arrangement Rb with respect to the x direction are initially assumed. The arrangement direction of dots 2 of the arrangement Rc forms an angle of −α with respect to the x direction (FIG. 1B). A pitch L1 of the dots 2 of the arrangement Rb in the y direction and a pitch L2 of the dots 2 of the arrangement Rc in the y direction may be the same or different.

Next, assume zigzag arrangements R (R1, R2, R3, R4, . . . ) where the arrangements Rb and Rc are repeatedly disposed at predetermined intervals L3$_1$ and L3$_2$ in the y direction. (FIG. 1A-1). In the present invention, the zigzag arrangements R do not necessarily need to include the arrangements Rb and Rc arranged alternately, as long as the arrangements Rb and Rc are repeatedly arranged. In the present embodiment, the arrangements Rb and Rc are arranged alternately.

In a zigzag arrangement R, the amount of deviations Ld1 and Ld2 between the closest dots of adjoining arrangements Rb and Rc in the x direction (FIG. 1A-2) can be set appropriately. In the present embodiment, the amount of deviation in the x direction between the arrangements Rb repeatedly provided in the y direction and the amount of deviation between the arrangements Rc in the x direction are zero, and thus Ld1=Ld2=Ld.

Next, assume that the zigzag arrangements R are arranged at a predetermined pitch pa in the x direction (FIG. 1B). Here, the positions of the zigzag arrangements R in the y direction are altered periodically (one cycle: R1, R2, R3, R4, R5, and R6) as shown by the double-dotted dashed polygonal line F in FIG. 1A-1, whereby the pseudo random dot pattern 1A is obtained.

In the present invention, the number of dots constituting an arrangement Rb and the number of dots constituting an arrangement Rc are not particularly limited. The lower limit of the numbers of dots constituting the respective arrangements Rb and Rc is two. The upper limit is preferably 10 or less since too large a number of dots makes the repetition unit difficult to ascertain. For convenience of dot arrangement design, it is preferably for the numbers of dots constituting the arrangements Rb and Rc each to he four or less, and more preferably three or less.

In the present embodiment, the angle formed between the arrangement Rb and the x direction is α, and the angle formed between. the arrangement Rc and the x direction is −α. The arrangement direction of the arrangement Rb and that of the arrangement Rc are thus synime uric about the x-axis. in the present invention, it is not necessary for the angle formed between the arrangement Rb and the x direction and the angle formed between the arrangement Rc and the x direction to have exactly identical absolute values. For convenience of design, the ratio of a difference between the absolute value of the angle formed between the arrangement Rb and the x direction and that of the angle formed between the arrangement Rc and the x direction to the absolute value of the angle formed between the arrangement Rb and the x direction is preferably 20% or less. This facilitates the creation of a pseudo random dot pattern where dots are uniformly distributed without overlap. Depending on settings such as the pitch L1, the pitch L2, the pitch pa, and the intervals L3, a pseudo random dot pattern where dots are uniformly distributed can be created even if the foregoing ratio exceeds 20%. To ensure irregular appearance, the absolute value of the angle α is preferably 5° to 85°, more preferably 10° to 80°, and yet more preferably 15< to 75°.

In the present embodiment, when the zigzag arrangements R arranged in the x direction are located at constant positions in the y direction (FIG. 1B), the pitch pa of the zigzag arrangements R in the x direction is constant. However, in the present invention, the pitch pa does not necessarily need to be constant if systematic. For example, a pitch pa1 and a pitch pa2 may appear at predetermined cycles. However, for convenience of design of the pseudo random dot pattern, when the zigzag arrangements R arranged in the x direction are located at constant positions in the y direction, it is desirable for the pitch pa of the zigzag arrangements R in the x direction to be constant.

In the present invention, it is desirable for pa>Lx to be satisfied, where Lx is the amplitude in the a direction of the polygonal line which forms a minimum repetition unit Ru (FIG. 1A-2) of the zigzag arrangements R including adjoining arrangements Rb and Rc. This can prevent dots from overlapping each other even if the positions of the zigzag arrangements R in the y direction are periodically altered in creating the pseudo random dot pattern. On the other hand, pa≤Lx may be implemented in the case of closely disposing dots in the x direction, for example.

The pitch L1 of the dots 2 of the arrangement Rb in the y direction, the pitch L2 of the dots 2 of the arrangements Rc in the y direction, and the pitch pa of the zigzag arrangements R in the x direction when the zigzag arrangements R are located at constant positions in the y direction as illustrated in FIG. 1B may be different from each other. In view of uniform dot dispersion and easy design of the pseudo random dot pattern, it is desirable that these pitches be the same. As employed herein, a fact that these pitches are the same means that the eventually obtained pseudo random dot pattern has substantially the same irregularity and uniformity.

As for the intervals L3 in the y direction when the arrangements Rb and Rc are alternately arranged in the y direction, a pseudo random dot pattern can be formed regardless of whether the interval $L3_1$ with an arrangement Rc above an arrangement Rb and the interval $L3_2$ with an arrangement Rb above an arrangement Rc are the same or different. In view of uniform dispersion of the dots 2 and easy design of the pseudo random dot pattern, it is preferable for these intervals $L3_1$ and $L3_2$ to be systematic. In particular, the intervals are more preferably constant and the same. The intervals $L3_1$ and $L3_2$ and the foregoing pitches L1, L2, and pa may be the same or different. In view of ease of design, it is yet more preferable that the intervals $L3_1$ and $L3_2$ are constant and the same, and the intervals L3 ($L3_1$ and $L3_2$) and the foregoing pitches L1, L2, and pa are the same.

In periodically altering the positions of the zigzag arrangements R in the y direction, the periodic alterations are not limited to any particular pattern. However, it is desirable for the positions of the zigzag arrangements R in The y direction to be altered along a polygonal line F0 (FIG. 1A-2), where the polygonal line F0 is configured to be symmetric, about y=x, to the polygonal line forming the minimum. repetition unit Ru of the zigzag arrangements R including adjoining arrangements Rb and Rc and correspond to one cycle of the zigzag arrangements R in the x direction. The dot arrangement in the repetition unit of the pseudo random dot pattern can thereby be made closer to be symmetric about y=x for improved dot uniformity. As will be described below, the periodic polygonal line extending in the x-axis direction in periodically altering the positions of the zigzag arrangements R in the y direction is not limited to F. When a polygonal line symmetric to the polygonal line forming the minimum repetition unit Ru of the zigzag arrangements R or a polygonal line obtained by modifying the same is used as the repetition unit of the periodic polygonal line extending in the x-axis direction, the axis of symmetry may be y≠x.

It is desirable for Ly<L3 ($L3_1$, $L3_2$) to be satisfied, where Ly is the maximum width of the polygonal line F in the y direction. The minimum repetition unit Ru of the pseudo random dot patten can thereby be configured as a dot pattern included in a rectangle U which has a length L0x in the x direction and a length L0y in the y direction (pattern with dark-shaded dots in FIGS. 1A-1 and 1A-2), where L0x is equivalent to one cycle of the zigzag arrangements R, and L0y is the length of the minimum repetition unit Ru in the y direction of the zigzag arrangements R in the y direction. If the pseudo random dot pattern is formed on a product, this facilitates a pass-fail test regarding the formation of the pseudo random dot pattern on the product. In particular, it is desirable for the number of dots in the minimum repetition unit Ru of the zigzag arrangements R including adjoining arrangements Rb and Rc and the number of arrangements in one cycle of the zigzag arrangements R in the x direction to be the same. In such a case, with the pitch L1=the pitch L2=the intervals L3=the pitch pa, the dot pattern serving as the minimum repetition unit Ru of the pseudo random dot pattern can be configured as a pattern symmetric about y=x. This is desirable because the pass-fail test regarding the formation of the pseudo random dot pattern on products is further facilitated.

(Modified Aspect of Dot Pattern)

Figure 2A:
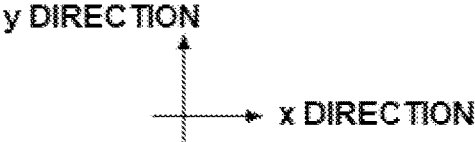
FIG. 2A shows a pseudo random dot pattern 1B according to an embodiment.

FIG. 2A shows a pseudo random dot pattern 1B, where the arrangements Rb and RC include two dots 2 each, the pitch L1=the pitch L2=the intervals L3=the pitch pa, the amount of deviation Ld/the pitch pa=0.25, and the angle α60°.

Figure 2B:
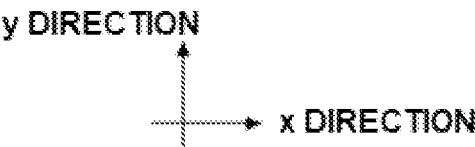
FIG. 2B is an explanatory diagram showing a creation method of the pseudo random dot pattern 1B according to the embodiment.

A creation method of this pseudo random dot pattern 1B includes: initially assuming zigzag arrangements R arranged at a pitch pa in the x direction as shown in FIG. 2B; then assuming a polygonal line F0 symmetric to the polygonal line forming the minimum repetition unit Ru of the zigzag arrangements R about y=x; moving the zigzag arrangements R arranged at the pitch pa along the polygonal line F0 in the y direction in order; and repeatedly performing the foregoing processes to obtain the pseudo random dot pattern shown in FIG. 2A.

In such a manner, a pseudo random dot pattern can be extremely easily formed by setting the pitch L1=the pitch L2=the intervals L3=the pitch pa, and making the number of dots constituting the minimum repetition unit Ru of the zigzag arrangements R and the number of arrangements in one cycle of the zigzag arrangements R in the x direction the same.

Figure 3A:
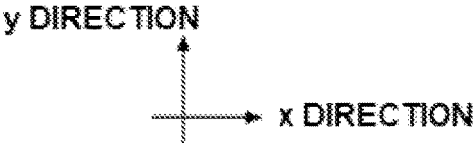
FIG. 3A shows a pseudo random dot pattern 1C according to an embodiment.

FIG. 3A shows a pseudo random dot pattern 1C, where the arrangements Rb and Rc include two dots 2 each, the pitch L1=the pitch L2=the intervals L3=the pitch Pa, the amount of deviation Ld/the pitch pa=0.5, and the angle α=60°.

Figure 3B:
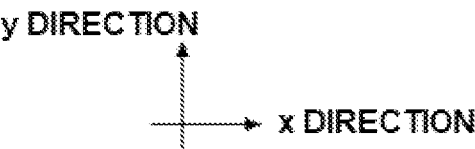
FIG. 3B is as explanatory diagram showing a creation method of the pseudo random dot pattern 1C according to the embodiment.

A creation method of this pseudo random dot. pattern 1C also includes: initially assuming zigzag arrangements R arranged at a pitch pa in the x direction as shown in FIG. 3B; moving the zigzag arrangements R in The x direction in order while altering the positions of the zigzag arrangements R in the y direction along a polygonal line F0 symmetric to the polygonal line forming the minimum repetition unit Ru of the zigzag arrangements R about y=x; and repeatedly performing the foregoing processes.

The dot pattern shown in FIG. 3B is such that first regions where arrangements Rb are arranged at a pitch pa in the x direction and second regions where arrangements Rc are arranged at the pitch pa in the x direction are alternately repeated in the y direction, and the extensions of the arrangement axes of the first regions also serve as those of the second regions. By contrast, the pseudo random dot pattern according to the present embodiment shown in FIG. 3A is formed by arranging the zigzag arrangements R at a pitch pa in the x direction while altering the positions of the zigzag arrangements R in the y direction. In the present embodiment, the extensions of the arrangement axes of the first regions where the arrangements Rb are arranged at a pitch pa in the x direction do not serve as those of the second regions where the arrangements Rc are arranged at the pitch pa in the x direction.

Figure 4:
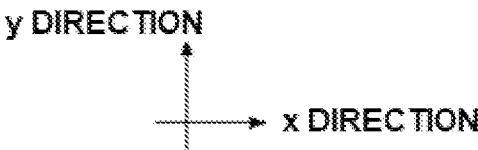
FIG. 4 shows a pseudo random dot pattern 1D according to an embodiment.

In the present invention, the polygonal line F0 serving as a reference in altering the positions of the zigzag arrangements R in the y direction is not limited to one symmetric to the polygonal line forming the minimum repetition unit Ru of the zigzag arrangements R about y=x. For example, FIG. 4 shows a pseudo random dot pattern 1D, where the zigzag arrangements R shown in FIG. 3B, arranged at a pitch pa in the direction are moved in the x direction while being altered along the polygonal line F0 which has the same shape as in FIG. 2A.

Figure 5:
FIG. 5 shows a pseudo random dot pattern 1E according to an embodiment.

FIG. 5 shows a pseudo random dot pattern 1E, where arrangements Rb1 and Rb2 or arrangements Rc1 and Rc2 repeated in the zigzag arrangements R in the pseudo random dot pattern 1B shown in FIG. 2A have an amount of deviation Le in the x direction. With such arrangement, the amount of deviation between the closest dots of adjoining arrangements Rb1 and Rc1 in the x direction is Ld, and the amount of deviation between the closest dots of adjoining arrangements Rc1 and Rb2 in the x direction is zero.

Figure 6A:
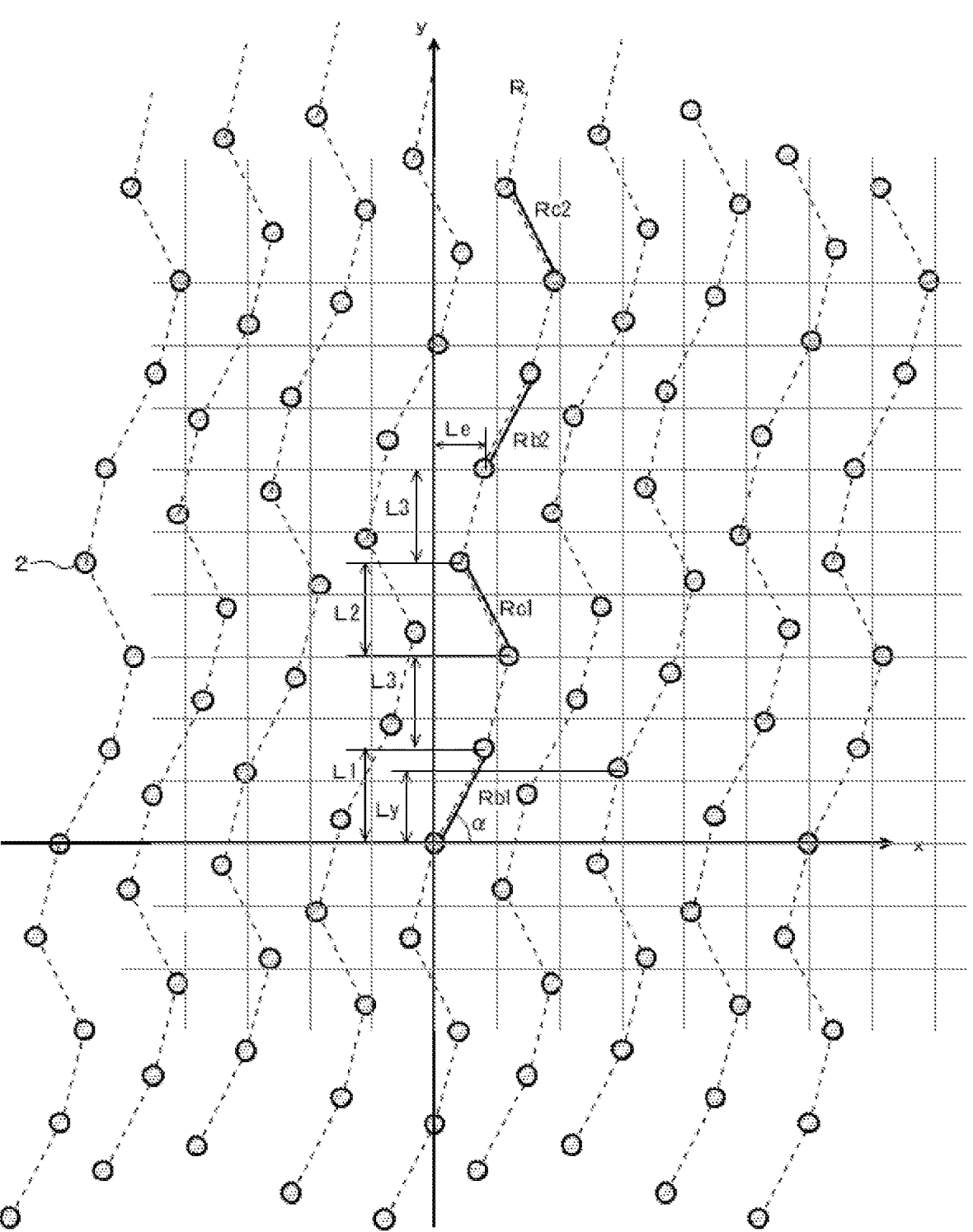
FIG. 6A shows a pseudo random dot pattern 1F according to an embodiment.

FIG. 6A shows a pseudo random dot pattern 1F, where the amount of deviation Le between the arrangements Rb1 and Rb2 in the x direction is further increased as compared to the pseudo random dot pattern 1E shown in FIG. 5. Depending on the magnitude of the amount of deviation Le, the extending direction of the zigzag arrangements R can thus be tilted with respect to the y-axis.

Figure 6B:
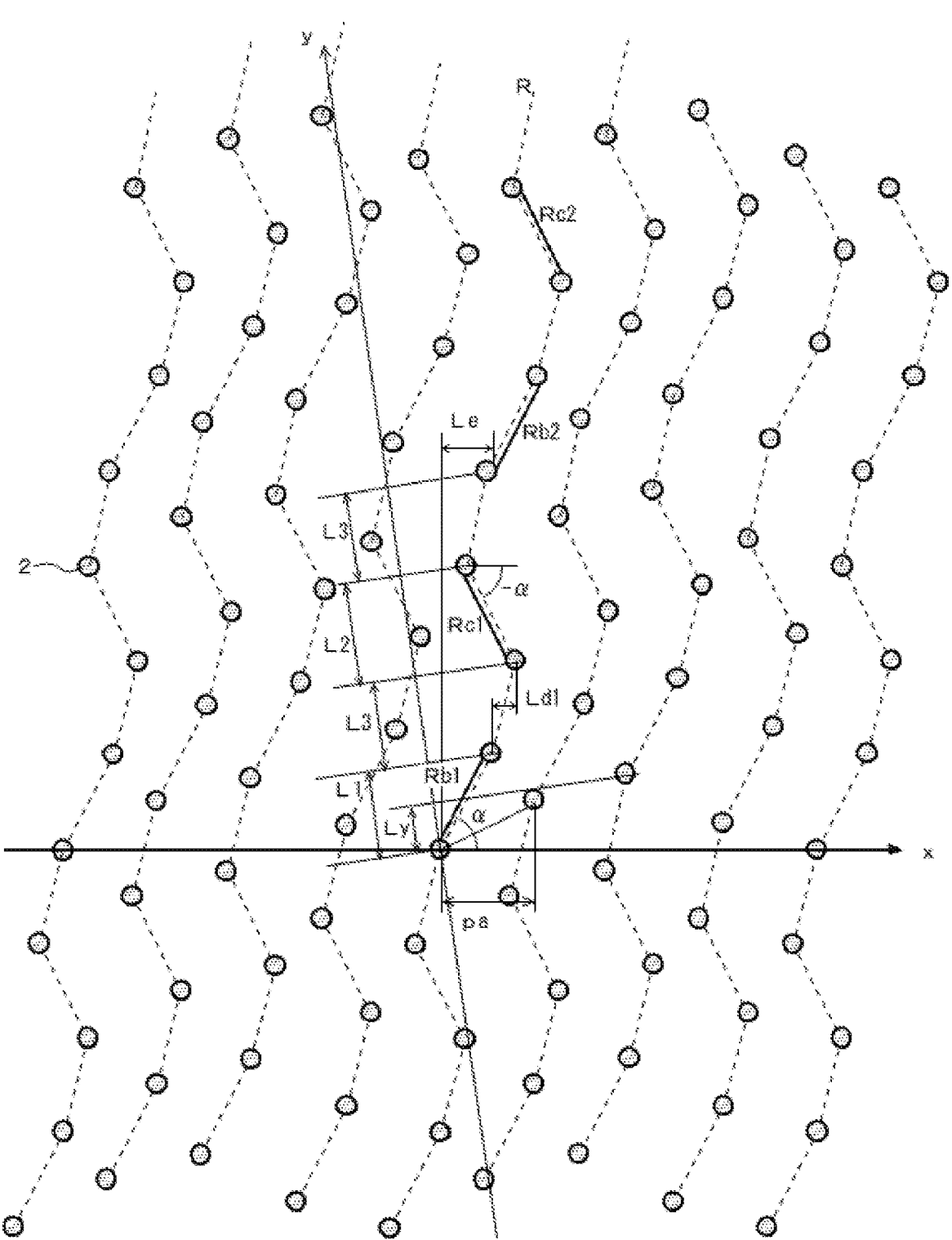
FIG. 6B shows the pseudo random dot pattern 1F according to the embodiment (using non-orthogonal coordinates).

In the present invention, the xy coordinates are not limited to orthogonal coordinates. For example, FIG. 6B is a representation of the foregoing pseudo random dot pattern 1F shown in FIG. 6A using non-orthogonal coordinates where the x direction and the y direction are not orthogonal. For ease of design, it is desirable for orthogonal coordinates to be used.

(Dot Configuration)

In the present invention, the dots disposed in the pseudo random dot pattern refer to small spots or structures. The small spots may include various fillers and other small solid bodies. The structures refer not only to convexes and protrusions but also to shapes such as concaves and recesses. The dot configuration can be determined as appropriate based on the object to which the pseudo random dot pattern is provided. For example, in the case of a moth-eye film, the dots can be nanostructures formed as concaves or convexes in/on a transparent resin substrate. In the case of an embossed film, the dots can be concaves or convexes of micron order. In the case of a light diffusion sheet, the dots can be a light diffusing filler. In the case of an electrically functional sheet, an electromagnetic shielding sheet, and the like, the dots can be a conductive filler. In the case of a heat dissipation sheet, the thermal conductivity of the dots is adjusted based on the substrate to retain the dots. Here, the heat transfer rate may be changed. The surface area may be increased. In the case of a dot projector, the dots can be microlenses.

The dots may have the shape of filler particles themselves or a transferred shape of the filler particles. The dots may have a spherical or similar protruding shape (round shape), a rod-like shape, or a flexible shape. The dots may have a tip end with a pointed shape or a round shape. The dots may have a composite shape like a spherical shape with even smaller adhering substances. The aspect ratios (the lengths in the xy plane directions with respect to a height or depth) of the dots can be adjusted as appropriate depending on the functionality, and are not limited in particular.

Specific examples of the dot configuration itself may include those described in Japanese Patent A plication Laid-Open Nos. 2018-124595, 2016-29446, and 2015-132689, and WO 2016/068166, WO 2016/068171, WO 2018/074318, WO 2018/101105, and WO 2018/051799.

(Size and Number Density of Dots)

In the present invention, the size of the dots 2 and the number density of the dots 2 (pieces/mm$^2$) on the XY plane can be appropriately set depending on the object to which the pseudo random dot pattern is provided. The size of the dots is usually less than 1000 μm in diameter, such as several tens of nanometers to several hundreds of micrometers, and can be greater than or equal to the visible light wavelengths and not greater than 200 μm. The lower limit of the number density can be usually 10 pieces/mm$^2$ or more, or 30 pieces/mm$^2$ or more. The upper limit can be determined in the range of $10^9$ pieces/mm$^2$ or less, $10^7$ pieces/mm$^2$ or less, $10^5$ pieces/mm$^2$ or less, or 70000 pieces/mm$^2$ or less. The dots 2 may have a size of less than several tens of nanometers. In particular, if the dots are filler particles, the upper limit of the particle diameter of the filler is 200 μm or less, preferably 50 μm or less, and more preferably 30 μm or less, in view of workability during manufacturing. The lower limt of the particle diameter of the filler is 0.5 μm or more, preferably 0.8 μm or more, and more preferably 1 μm or more, in view of inspection during manufacturing.

For example, if a pseudo random dot pattern of nanostructures is disposed on a transparent substrate to constitute an optical structure such as a moth-eye film or a concavo-convex structure, the number density of the nanostructures can be (10 to 1000)×$10^6$ pieces/mm$^2$.

In the present invention, the filler may have an optical function (function that an optical element may have, such as light intensity adjustment, optical filtering, light diffusion, light shielding, and optical wavelength conversion, or absorbability of pigment to a specific wavelength, etc.), an insulating property, electrical conductivity, thermal conductivity, etc. The filler may have properties used for surface treatment, such as hydrophilic and lipophilic properties. If such a filler is disposed in a pseudo random dot pattern on a resin layer to obtain a functional film (or a functional surface) which has various optical characteristics, an electromagnetic shielding property, electrical conductivity, a heat dissipation property, a surface modification property, or the like, the number density of the filler can be 500000 pieces/mm$^2$ or less, 350000 pieces/mm$^2$ or less, 10 to 100000 pieces/mm$^2$, or 30 to 70000 pieces/mm$^2$. More specifically, if, for example, a light diffusion filler is disposed in a pseudo random dot pattern on a resin layer to constitute a light diffusion sheet, the number density of the light diffusion filler particles which have a filler particle diameter of 1 μm or more can be 100 to 500000 pieces/mm$^2$, and preferably 10 to 100000 pieces/mm$^2$.

The number density of the dots can be determined by using a metallurgical microscope, an electron microscope (such as an SEM and a TEM), or the like depending on the dot size. A three-dimensional surface measuring instrument may be used depending on the size. The number density may also be determined by measuring an observation image using image analysis software (such as WinROOF (MITANI Corporation) and A-Zo Kun (registered trademark) (Asahi Kasei Engineering Corporation)).

(Use Applications of Pseudo Random Dot Pattern)

Aside from various use applications where pseudo random dot patterns have conventionally been provided, the pseudo random dot pattern according to the present invention may be used in applications where a pseudo random dot pattern has not necessarily been required. For example, the pseudo random dot pattern according to the present invention can be used for a moth-eye film, a dot projector, a light diffusion sheet, etc., as well as for functional films or the like with various functions including optical wavelength conversion, electrical conductivity, a heat dissipation property, and electromagnetic shielding. The pseudo random dot pattern can be used. for daily commodities and materials thereof, utilizing surface properties. Producing methods themselves of such items can be similar to conventional ones. In providing a pseudo random dot pattern on a predetermined object, the pseudo random dot pattern does not necessarily need to be disposed over the entire surface of the object. For example, a pseudo random dot pattern may be scattered like island structures.

The pseudo random dot pattern is a mode of regular arrangement, and can be used in a use application intermediate between one where a conventional random dot pattern is provided and one where dots are regularly disposed in a rectangular, right polygonal, or other lattice-like configuration. Among these, examples of the usage include detailed inspection of the respective effects of a random arrangement and a regular arrangement. For example, the wettability of nanostructures can be controlled by controlling the aspect ratios and repetition pitches of the structures and. the material-based contact angle. Here, the pseudo random dot pattern is expected to enable wettability direction control. The use of the pseudo random dot pattern is also expected to improve functionality and develop new functions in applications where properties depend on the surface configuration of nanometer to micrometer order (such as electrode materials and osmosis membranes), in life science, and in medical and biotechnological applications (such as cell disruption and cell culture). Moreover, the concave and convex shapes disposed in the pseudo random dot pattern can be used as a die. In various applications of the pseudo random dot pattern, there may be a layer other than the layer with the pseudo random dot pattern. For example, a layer formed by providing a pseudo random dot pattern of filler particles on a film member or a pseudo random dot pattern of concave and convex structures on a film surface may be disposed on another object via a pressure-sensitive adhesive or an adhesive. Another layer may be interposed between the film member with the pseudo random dot pattern and another object. The publications cited above may be referred to for the producing methods of such products.

As described above, the pseudo random dot pattern can be developed in various ways depending on the combination with the base material for the pseudo random dot pattern to be provided on. Articles obtained by providing the pseudo random dot pattern of the present invention for various applications are also included in the present invention.

(Producing Method of Pseudo Random Dot Pattern)

Conventional methods can be used as the producing method itself of the pseudo random dot pattern. For example, moth-eye films and similar products can be manufactured as described in WO 2012/133943. Products using a filler can be manufactured as described in WO 2016/068166, WO 2016/068171, WO 2018/074318, WO 2018/101105, and WO 2018/051799 cited above.

As a producing method of various types of sheets which. uses small solid bodies such as a light, diffusing filler, an insulating filler, and a conductive filler, a resin layer of the intended sheet is formed on a releasing base material which has a smooth surface like a PET film. Meanwhile, a metal die with a pseudo random dot pattern of concave portions is formed, and a resin is poured into the metal die to form a resin die. The concave portions of the resin die are filled with small solid bodies, the foregoing resin layer is stacked thereon, and the small solid bodies are transferred to the resin layer. The small solid bodies are pushed into the resin layer, and if needed, a resin layer is further stacked thereon. A sheet in which the small solid bodies are disposed in the pseudo random dot pattern in a plan view can thereby be obtained. Using the sheet including the resin layer where the small solid bodies are provided, processing for disposing small solid bodies on the surface of a separate object can also be performed. More specific examples of the producing method of a filler-containing film itself may include the methods described in e.g., WO 2016/068171, WO 2018/074318, WO 2018/101105, and WO 2018/051799.

Figure 9:
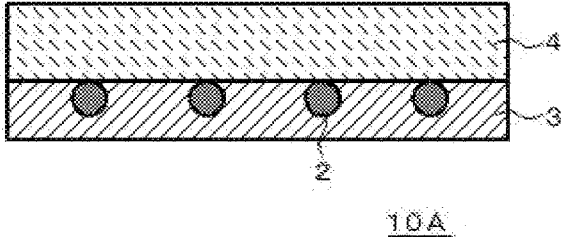
FIG. 9 is a cross-sectional view of a filler-containing film 10A where a filler is disposed in a random dot pattern.
Figure 10:
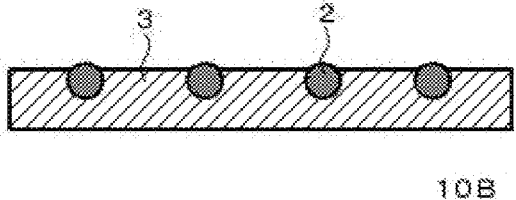
FIG. 10 is a cross-sectional view of a filler-containing film 10B where a filler is disposed in a random dot pattern.
Figure 11:
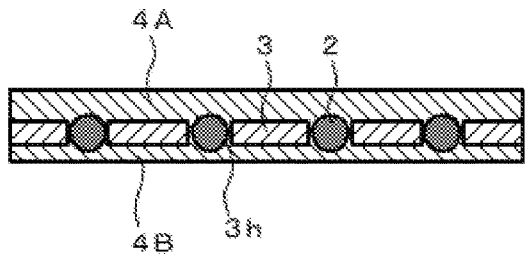
FIG. 11 is a cross-sectional view of a filler-containing film 10C where a filler is disposed in a random dot pattern.

For example, as shown in FIG. 9, a filler-containing film 10A having a layer configuration where a single layer of fillers (small solid bodies) 2 is disposed in a random dot pattern on or near the surface of an insulating resin layer 3, and a low-viscosity resin layer 4 is stacked thereon can thereby be obtained. As shown in FIG. 10, a filler-containing film 10B having a layer configuration where the low-viscosity resin layer 4 is omitted may be formed. On the other hand, like a filler-containing film 10C shown in FIG. 11, a layer configuration where through holes 3h are formed in a random dot pattern in an insulating film 3, fillers (small solid bodies) 2 is held in the through holes 3h, and low-viscosity resin layers 4A and 4B are stacked on the top and bottom surfaces thereof may be employed. In such a case, the insulating film 3 is formed of a resin layer less prone to deformation by heat or pressure than the low-viscosity resin layers 4A and 4B. The relationship in physical properties between the resin layers to be stacked is not limited thereto, and may be changed as appropriate depending on the intended use.

The smoothness of the object to which the pseudo random dot pattern of the present invention is provided. is not limited in particular. The object may be smooth, uneven, or undulated.

A smooth surface where the pseudo random dot pattern is provided may be subjected to undulating treatment. The pseudo random dot pattern may be provided on a plane undulated in advance. The undulation may be such that the pseudo random dot pattern can be identified. For example, the smooth surface may be undulated within one cycle in the x direction or y direction in FIG. 1A-1, or undulated over a plurality of cycles.

The material of the surface of the base material to which the pseudo random dot pattern is provided is not limited in particular. For example, conventional resins may be used. Inorganic materials such as a metal, an alloy, glass, and ceramics may be used. An organic-inorganic hybrid material or a surface including both organic and inorganic materials (examples include a transparent conductive film where ITO wiring is provided) may be used. As a method for disposing the pseudo random dot pattern on a flat resin film, methods described in the publications cited above can be used.

EXAMPLE

The present invention will now be specifically described in conjunction with an example.

Example 1

The pseudo random dot pattern shown in FIG. 2A was formed, where dots 2 had a diameter of 3 μm, L1=L2=L3=pa=8 μm, and the number density of dots 2 was 16000/mm$^2$.

Figure 7:
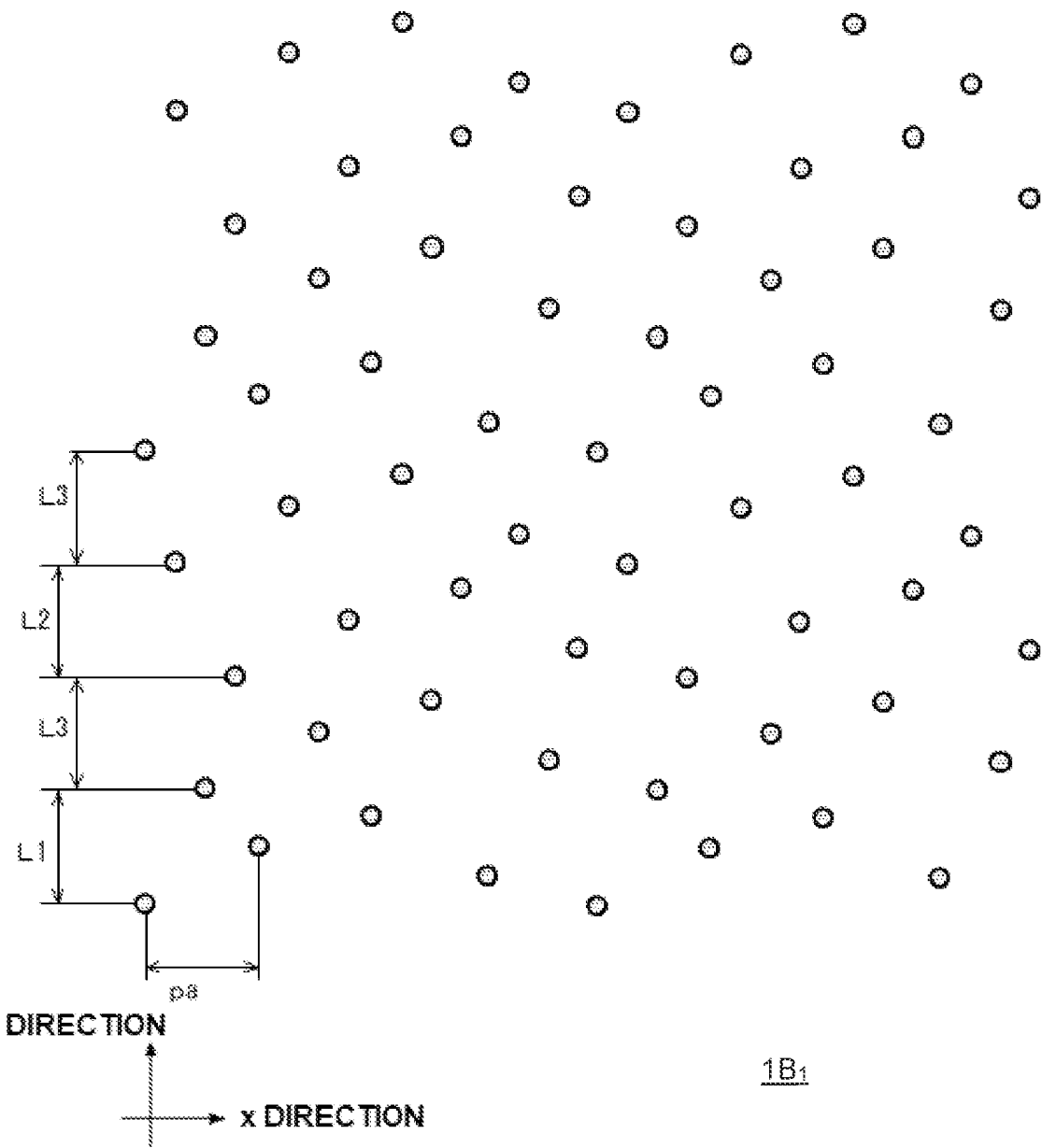
FIG. 7 shows a pseudo random dot pattern 1B$_1$ according to an embodiment.

FIG. 7 shows the resulting dot pattern 1B$_1$.

Comparative Example 1

The dot pattern shown in FIG. 2B was formed, where dots 2 had a diameter of 3 μm, L1=L2=L3=pa=8 μm, and the number density of dots 2 was 16000 pieces/mm$^2$.

Figure 8:
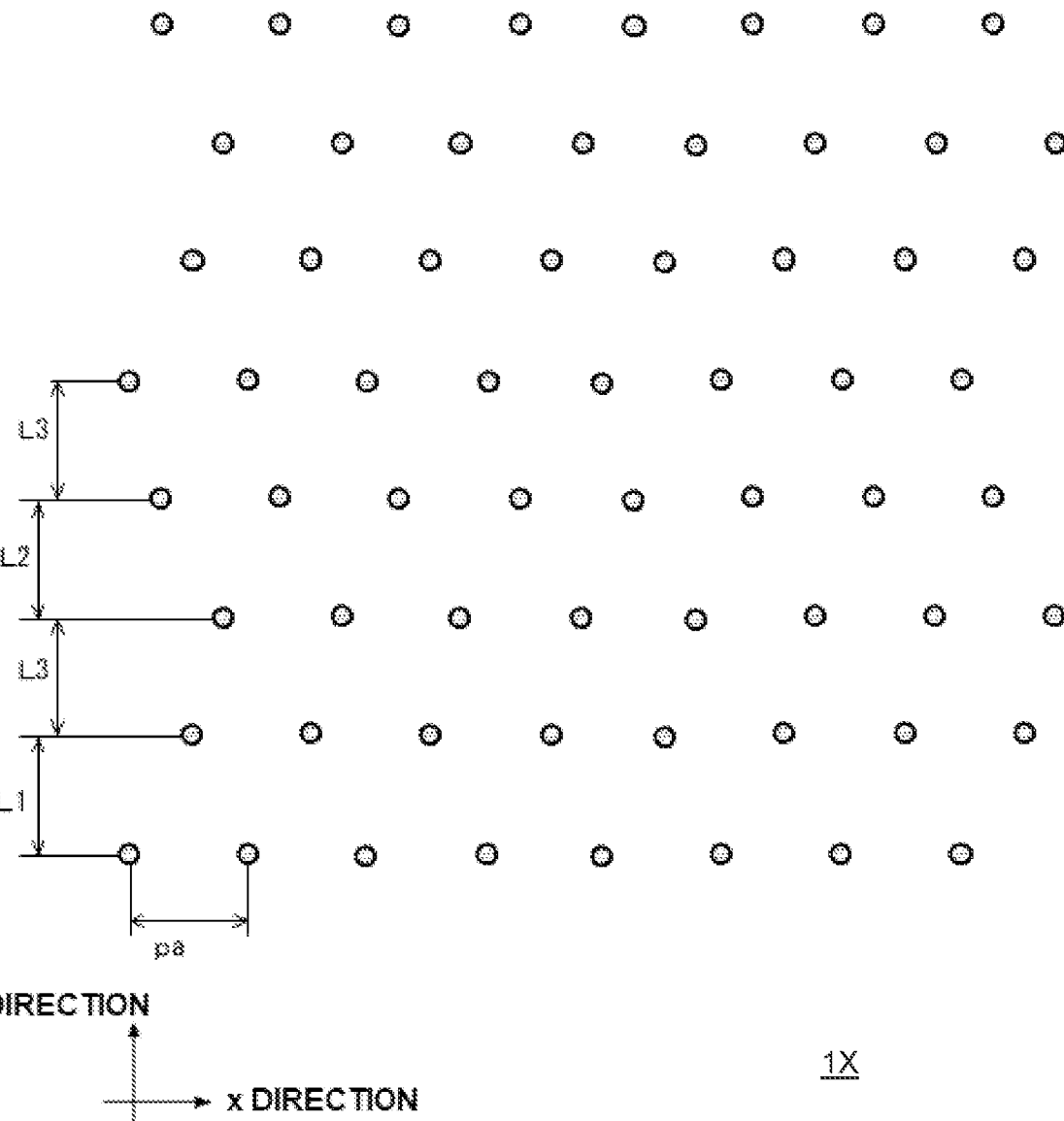
FIG. 8 shows a dot pattern 1X of a comparative example.

FIG. 8 shows the resulting dot pattern 1X.

A comparison between FIGS. 1 and 8 shows that the pattern of the example has superior apparent irregularity.

REFERENCE SIGNS LIST 1A, 1B, 1B$_1$, 1C, 1D, 1F, 1F pseudo random. dot pattern.
2 dot, filler
3 insulating resin layer, insulating film
4, 4A, 4B low-viscosity resin layer
10A, 10B, 10C filler-containing film
F polygonal line
F0 polygonal line that is symmetric to polygonal line forming minimum. repetition unit Ru of zigzag arrangements R with respect to y=x
pa pitch of zigzag arrangements R in x direction when zigzag arrangements R are located at constant positions in y direction
R zigzag arrangement
Ru minimum repetition unit of zigzag arrangements R

The invention claimed is:

1. A pseudo random dot pattern including zigzag arrangements R arranged at a predetermined pitch in an x direction on an xy plane while periodically altering positions thereof in a y direction, the zigzag arrangements R each including an arrangement Rb and an arrangement Rc repeatedly provided at predetermined intervals in the y direction, the arrangement Rb including dots arranged at a positive inclination, the arrangement Rc including dots arranged at a negative inclination, wherein a pitch pa of the zigzag arrangements R in the x direction when the zigzag arrangements R arranged in the x direction are located at constant positions in the y direction is constant, and wherein a maximum width Lx of a polygonal line forming a minimum repetition unit of the zigzag arrangements R in the x direction is less than the pitch pa.

2. The pseudo random dot pattern according to claim 1, wherein the arrangement Rc is arranged in a direction reverse to an arrangement direction of the arrangement Rb with respect to the x direction.

3. The pseudo random dot pattern according to claim 1, wherein an interval L3 in the y direction between the arrangement Rb and the arrangement Rc is constant.

4. The pseudo random dot pattern according to claim 3, wherein a pitch L1 of dots of the arrangement Rb in the y direction, a pitch L2 of dots of the arrangement Rc in the y direction, and the interval L3 are the same.

5. The pseudo random dot pattern according to claim 3, wherein the pitch pa, a pitch L1 of dots of the arrangement Rb in the y direction, a pitch L2 of dots of the arrangement Rc in the y direction, and the interval L3 are the same.

6. The pseudo random dot pattern according to claim 3, wherein a maximum width Ly of a polygonal line forming a minimum repetition unit of the zigzag arrangements R in the y direction is less than the interval L3.

7. The pseudo random dot pattern according to claim 1, wherein a number of dots constituting a minimum repetition unit of the zigzag arrangements R and a number of arrangements of the zigzag arrangement in the x direction corresponding to one cycle of alteration in position of the zigzag arrangements R in the y direction are the same.

8. The pseudo random dot pattern according to claim 1, wherein dot arrangements in which dots constituting a minimum repetition unit in the zigzag arrangement R are arranged in the x direction while altering the position thereof in one cycle in the y direction are symmetric about y=x.

9. A creation method of a pseudo random dot pattern, the creation method comprising: arranging zigzag arrangements R at a predetermined pitch in an x direction on an xy plane while periodically altering positions thereof in a y direction, the zigzag arrangements R each including an arrangement Rb and an arrangement Rc repeatedly provided at predetermined intervals in the y direction, the arrangement Rb including dots arranged at a positive inclination, the arrangement Rc including dots arranged at a negative inclination, wherein a pitch pa of the zigzag arrangements R in the x direction when the zigzag arrangements R arranged in the x direction are located at constant positions in the y direction is constant, and wherein a maximum width Lx of a polygonal line forming a minimum repetition unit of the zigzag arrangements R in the x direction is less than the pitch pa.

10. A filler-containing film comprising a resin layer and a filler, the filler being disposed in a pseudo random dot pattern in a plan view, the pseudo random dot pattern including zigzag arrangements R arranged at a predetermined pitch in an x direction on an xy plane while periodically altering positions thereof in a y direction, the zigzag arrangements R each including an arrangement Rb and an arrangement Rc repeatedly provided at predetermined intervals in the y direction, the arrangement Rb including filler particles arranged at a positive inclination, the arrangement Rc including filler particles arranged at a negative inclination, wherein a pitch pa of the zigzag arrangements R in the x direction when the zigzag arrangements R arranged in the x direction are located at constant positions in the y direction is constant, and wherein a maximum width Lx of a polygonal line forming a minimum repetition unit of the zigzag arrangements R in the x direction is less than the pitch pa.

11. A pseudo random dot pattern including zigzag arrangements R arranged at a predetermined pitch in an x direction on an xy plane while periodically altering positions thereof in a y direction, the zigzag arrangements R each including an arrangement Rb and an arrangement Rc repeatedly provided at predetermined intervals in the y direction, the arrangement Rb including dots arranged at a positive inclination, the arrangement Rc including dots arranged at a negative inclination, wherein an interval L3 in the y direction between the arrangement Rb and the arrangement Rc is constant, and wherein a maximum width Ly of a polygonal line forming a minimum repetition unit of the zigzag arrangements R in the y direction is less than the interval L3.

12. The pseudo random dot pattern according to claim 11, wherein the arrangement Rc is arranged in a direction reverse to an arrangement direction of the arrangement Rb with respect to the x direction.

13. The pseudo random dot pattern according to claim 11, wherein a pitch pa of the zigzag arrangements R in the x direction when the zigzag arrangements R arranged in the x direction are located at constant positions in the y direction is constant.

14. The pseudo random dot pattern according to claim 11, wherein a pitch L1 of dots of the arrangement Rb in the y direction, a pitch L2 of dots of the arrangement Rc in the y direction, and the interval L3 are the same.

15. The pseudo random dot pattern according to claim 11, wherein the pitch pa, a pitch L1 of dots of the arrangement Rb in the y direction, a pitch L2 of dots of the arrangement Rc in the y direction, and the interval L3 are the same.

16. The pseudo random dot pattern according to claim 11, wherein a number of dots constituting a minimum repetition unit of the zigzag arrangements R and a number of arrangements of the zigzag arrangement in the x direction corresponding to one cycle of alteration in position of the zigzag arrangements R in the y direction are the same.

17. The pseudo random dot pattern according to claim 11, wherein dot arrangements in which dots constituting a minimum repetition unit in the zigzag arrangement R are arranged in the x direction while altering the position thereof in one cycle in the y direction are symmetric about y=x.

18. The pseudo random dot pattern according to claim 13, wherein a maximum width Lx of a polygonal line forming a minimum repetition unit of the zigzag arrangements R in the x direction is less than the pitch pa.

19. A creation method of a pseudo random dot pattern, the creation method comprising: arranging zigzag arrangements R at a predetermined pitch in an x direction on an xy plane while periodically altering positions thereof in a y direction, the zigzag arrangements R each including an arrangement Rb and an arrangement Rc repeatedly provided at predetermined intervals in the y direction, the arrangement Rb including dots arranged at a positive inclination, the arrangement Rc including dots arranged at a negative inclination, wherein an interval L3 in the y direction between the arrangement Rb and the arrangement Rc is constant, and wherein a maximum width Ly of a polygonal line forming a minimum repetition unit of the zigzag arrangements R in the y direction is less than the interval L3.

20. A filler-containing film comprising a resin layer and a filler, the filler being disposed in a pseudo random dot pattern in a plan view, the pseudo random dot pattern including zigzag arrangements R arranged at a predetermined pitch in an x direction on an xy plane while periodically altering positions thereof in a y direction, the zigzag arrangements R each including an arrangement Rb and an arrangement Rc repeatedly provided at predetermined intervals in the y direction, the arrangement Rb including filler particles arranged at a positive inclination, the arrangement Rc including filler particles arranged at a negative inclination, wherein an interval L3 in the y direction between the arrangement Rb and the arrangement Rc is constant, and wherein a maximum width Ly of a polygonal line forming a minimum repetition unit of the zigzag arrangements R in the y direction is less than the interval L3.

\* \* \* \* \*